United States Patent [19]

Sussman

[11] 4,376,570
[45] Mar. 15, 1983

[54] MICROSCOPE OBJECTIVE

[75] Inventor: Milton H. Sussman, Amherst, N.Y.

[73] Assignee: Warner Lambert Technologies, Inc., Southbridge, Mass.

[21] Appl. No.: 243,979

[22] Filed: Mar. 16, 1981

[51] Int. Cl.³ .............................................. G02B 21/02
[52] U.S. Cl. ..................................... 350/414; 350/465
[58] Field of Search ............................... 350/414, 465

[56] References Cited

U.S. PATENT DOCUMENTS 3,355,234 11/1967 Muller .
3,598,474 8/1971 Shoemaker .
3,902,793 9/1975 Shoemaker .
3,912,378 10/1975 Goto .

Primary Examiner—John K. Corbin
Assistant Examiner—Rebecca D. Gass
Attorney, Agent, or Firm—Alan H. Spencer

[57] ABSTRACT

A five component microscope objective has a numerical aperture of 1.25. When used with a telescope as described in U.S. Pat. No. 3,355,234 and an immersion oil, the objective provides a magnification of $100 \times X$ in an embodiment having a focal length of 1.824 mm and is well corrected for the usual chromatic image aberrations, spherical aberration, coma and astigmatism.

2 Claims, 1 Drawing Figure

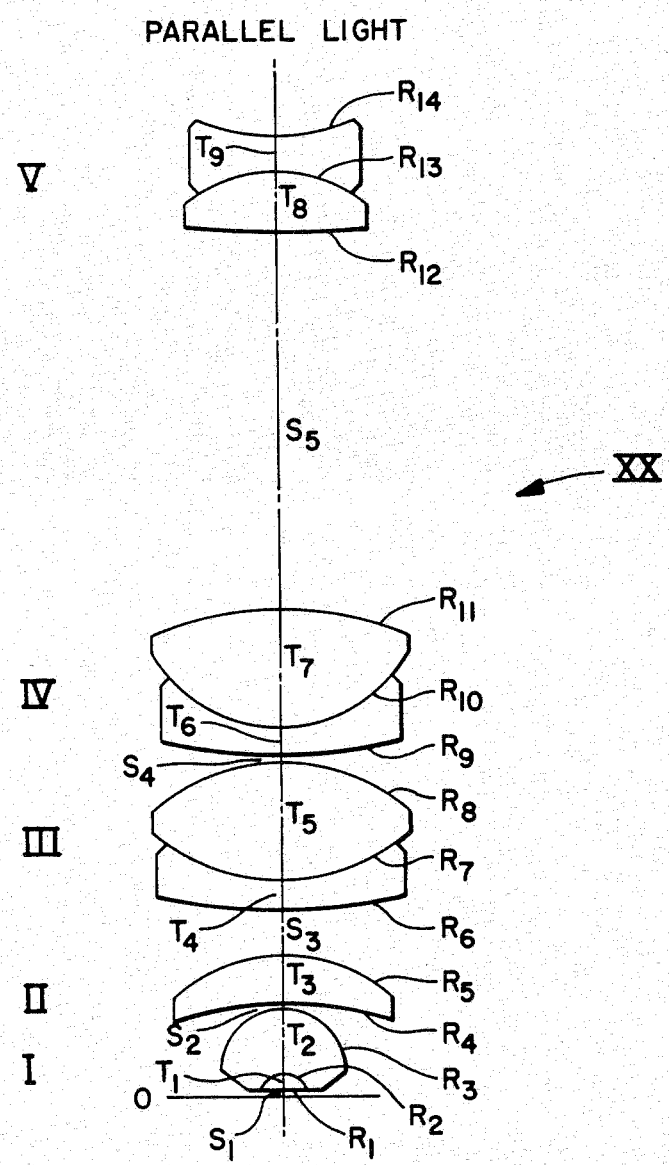

MICROSCOPE OBJECTIVE

BACKGROUND OF THE INVENTION

This invention relates to microscope objectives and more particularly to microscope objectives having a numerical aperture of substantially 1.25 and a magnification of 100×, when used with a telescope objective as described in U.S. Pat. No. 3,355,234, an immersion oil and having a focal length of 1.824 mm.

Microscope objectives according to this invention are well corrected for the usual chromatic image aberrations, spherical aberration, coma and astigmatism when used with a telescope objective and have a substantially flat image field.

U.S. Pat. No. 3,598,474, issued Aug. 10, 1971, discloses a five component oil immersion objective having an N.A. of 1.25. While the components have the same general configuration as the corresponding components of the present invention, the specific curves, spacings, thicknesses and glasses are different.

U.S. Pat. No. 3,902,793, issued Sept. 2, 1975, discloses a five component oil immersion objective having an N.A. of 1.25. While the components have the same general configurations as the corresponding components of the present invention, the specific curves, spacings, thicknesses and glasses differ.

U.S. Pat. No. 3,912,378, issued Oct. 14, 1975, discloses a five component oil immersion objective having an N.A. of 1.35. While most components have the same general configuration as the corresponding components of the present invention, the number of elements in three of the components is different as well as specific curves, thicknesses, spacings and glasses.

DESCRIPTION OF THE DRAWING AND INVENTION

The drawing is an optical diagram of an embodiment of the present invention.

Referring to the drawing, objective XX is shown in a view transverse to its optical axis relative to object plane 0 and illustrates the lens components aligned along the optical axis. The first component I of objective XX is a plano-convex positive doublet followed by second lens component II, which is a concavo-convex positive singlet. Third lens component III and fourth lens component IV are biconvex positive doublets. Fifth lens component V is a convex-concavo positive doublet. Doublet components III and IV each have convex-concavo first elements and biconvex second elements, while doublet component V has a biconvex first element and a biconcavo second element.

The parameters of objectives according to the present invention are set forth in Table I, wherein successive axial spaces are identified as $S_1$ to $S_5$ and axial thicknesses of successive lens elements are identified as $T_1$ to $T_9$. The radii of successive lens surfaces are designated $R_1$ to $R_{14}$ with the minus sign (−) being applied to the radius of a surface whose center of curvature lies on the object side of its vertex. The refractive indices and Abbe numbers of the successive lenses are absolute values designated $ND_1$ to $ND_9$ and $\nu_1$ to $\nu_9$ successively.

TABLE I

| Lens | Radius (R) | Thickness (T) | Spacing (S) | Refractive Index (ND) | Abbe No (ν) |
|---|---|---|---|---|---|
| | | | $S_1 = 0.148f$ | | |
| I | $R_1 = \infty$ | $T_1 = 0.313f$ | | $1.53 < ND_1 < 1.55$ | $50 < \nu_1 < 52$ |
| | $R_2 = -0.583f$ | $T_2 = 1.469f$ | | $1.87 < ND_2 < 1.89$ | $40 < \nu_2 < 42$ |
| | $R_3 = -1.356f$ | | $S_2 = 0.011f$ | | |
| II | $R_4 = -7.791f$ | $T_3 = 1.096f$ | | $1.78 < ND_3 < 1.80$ | $46.5 < \nu_3 < 48.5$ |
| | $R_5 = -3.448f$ | | $S_3 = 0.872f$ | | |
| III | $R_6 = 7.582f$ | $T_4 = 0.658f$ | | $1.77 < ND_4 < 1.79$ | $25 < \nu_4 < 27$ |
| | $R_7 = 4.404f$ | $T_5 = 2.632f$ | | $1.43 < ND_5 < 1.45$ | $94.5 < \nu_5 < 96.5$ |
| | $R_8 = -4.404f$ | | $S_4 = 0.027f$ | | |
| IV | $R_9 = 12.084f$ | $T_6 = 0.658f$ | | $1.77 < ND_6 < 1.79$ | $25 < \nu_6 < 27$ |
| | $R_{10} = 3.284f$ | $T_7 = 2.522f$ | | $1.43 < ND_7 < 1.45$ | $94.5 < \nu_7 < 96.5$ |
| | $R_{11} = -9.956f$ | | $S_5 = 8.728f$ | | |
| V | $R_{12} = 78.162f$ | $T_8 = 1.371f$ | | $1.77 < ND_8 < 1.79$ | $25 < \nu_8 < 27$ |
| | $R_{13} = -3.448f$ | $T_9 = 0.828f$ | | $1.60 < ND_9 < 1.62$ | $43.5 < \nu_9 < 45.5$ |
| | $R_{14} = 4.342f$ | | | | | wherein f = 1.8 to 1.85 mm.

Table II presents the preferred embodiment wherein f=1.824 mm.

TABLE II

| Lens | Radius (R) | Thickness (T) | Spacing (S) | Refractive Index (ND) | Abbe No (ν) |
|---|---|---|---|---|---|
| | | | $S_1 = 0.27$ | | |

TABLE II-continued

| Lens | Radius (R) | Thickness (T) | Spacing (S) | Refractive Index (ND) | Abbe No ($\nu$) |
|---|---|---|---|---|---|
|  | $R_1 = \infty$ |  |  |  |  |
|  |  | $T_1 = 0.57$ |  | $ND_1 = 1.540$ | $\nu_1 = 51.1$ |
| I | $R_2 = -1.063$ |  |  |  |  |
|  |  | $T_2 = 2.68$ |  | $ND_2 = 1.883$ | $\nu_2 = 40.8$ |
|  | $R_3 = -2.473$ |  |  |  |  |
|  |  |  | $S_2 = 0.02$ |  |  |
|  | $R_4 = -14.210$ |  |  |  |  |
| II |  | $T_3 = 2.00$ |  | $ND_3 = 1.788$ | $\nu_3 = 47.4$ |
|  | $R_5 = -6.290$ |  |  |  |  |
|  |  |  | $S_3 = 1.59$ |  |  |
|  | $R_6 = 13.830$ |  |  |  |  |
|  |  | $T_4 = 1.20$ |  | $ND_4 = 1.784$ | $\nu_4 = 26.1$ |
| III | $R_7 = 8.033$ |  |  |  |  |
|  |  | $T_5 = 4.80$ |  | $ND_5 = 1.434$ | $\nu_5 = 95.6$ |
|  | $R_8 = -8.033$ |  |  |  |  |
|  |  |  | $S_4 = 0.05$ |  |  |
|  | $R_9 = 22.042$ |  |  |  |  |
|  |  | $T_6 = 1.20$ |  | $ND_6 = 1.784$ | $\nu_6 = 26.1$ |
| IV | $R_{10} = 5.990$ |  |  |  |  |
|  |  | $T_7 = 4.60$ |  | $ND_7 = 1.434$ | $\nu_7 = 95.6$ |
|  | $R_{11} = -18.160$ |  |  |  |  |
|  |  |  | $S_5 = 15.92$ |  |  |
|  | $R_{12} = 142.568$ |  |  |  |  |
|  |  | $T_8 = 2.50$ |  | $ND_8 = 0\,1.784$ | $\nu_8 = 26.1$ |
| V | $R_{13} = -6.290$ |  |  |  |  |
|  |  | $T_9 = 1.51$ |  | $ND_9 = 1.613$ | $\nu_9 = 44.3$ |
|  | $R_{14} = 7.920$ |  |  |  |  |

What is claimed:

1. A five-component microscope objective having an N.A. of 1.25 comprising a plano-convex doublet I, a concavo-convex singlet II, a biconvex doublet III, a biconvex doublet IV and a convex-concavo doublet V having the following parameters:

| Lens | Radius (R) | Thickness (T) | Spacing (S) |
|---|---|---|---|
|  |  |  | $S_1 = 0.148f$ |
|  | $R_1 = \infty$ |  |  |
|  |  | $T_1 = 0.313f$ |  |
| I | $R_2 = -0.583f$ |  |  |
|  |  | $T_2 = 1.469f$ |  |
|  | $R_3 = -1.356f$ |  |  |
|  |  |  | $S_2 = 0.011f$ |
|  | $R_4 = -7.791f$ |  |  |
| II |  | $T_3 = 1.096f$ |  |
|  | $R_5 = -3.448f$ |  |  |
|  |  |  | $S_3 = 0.872f$ |
|  | $R_6 = 7.582f$ |  |  |
|  |  | $T_4 = 0.658f$ |  |
| III | $R_7 = 4.404f$ |  |  |
|  |  | $T_5 = 2.632f$ |  |
|  | $R_8 = -4.404f$ |  |  |
|  |  |  | $S_4 = 0.027f$ |
|  | $R_9 = 12.084f$ |  |  |
|  |  | $T_6 = 0.658f$ |  |
| IV | $R_{10} = 3.284f$ |  |  |
|  |  | $T_7 = 2.522f$ |  |

-continued

| Lens | Radius (R) | Thickness (T) | Spacing (S) |
|---|---|---|---|
|  | $R_{11} = -9.956f$ |  |  |
|  |  |  | $S_5 = 8.728f$ |
|  | $R_{12} = 78.162f$ |  |  |
|  |  | $T_8 = 1.371f$ |  |
| V | $R_{13} = -3.448f$ |  |  |
|  |  | $T_9 = 0.828f$ |  |
|  | $R_{14} = 4.342f$ |  |  |

| Lens | Refractive Index (ND) | Abbe No ($\nu$) |
|---|---|---|
| I | $1.53 < ND_1 < 1.55$ | $50 < \nu_1 < 52$ |
|  | $1.87 < ND_2 < 1.89$ | $40 < \nu_2 < 42$ |
| II | $1.78 < ND_3 < 1.80$ | $46.5 < \nu_3 < 48.5$ |
|  | $1.77 < ND_4 < 1.79$ | $25 < \nu_4 < 27$ |
| III |  |  |
|  | $1.43 < ND_5 < 1.45$ | $94.5 < \nu_5 < 96.5$ |
|  | $1.77 < ND_6 < 1.79$ | $25 < \nu_6 < 27$ |
| IV |  |  |
|  | $1.43 < ND_7 < 1.45$ | $94.5 < \nu_7 < 96.5$ |
|  | $1.77 < ND_8 < 1.79$ | $25 < \nu_8 < 27$ |
| V |  |  |
|  | $1.60 < ND_9 < 1.62$ | $43.5 < \nu_9 < 45.5$ | wherein $f = 1.8$ to $1.85$ mm.

2. The objective of claim 1 wherein f is 1.824 mm, $ND_1$ is 1.540, $ND_2$ is 1.883, $ND_3$ is 1.788, $ND_4$ and $ND_6$ and $ND_8$ are 1.784, $ND_5$ and $ND_7$ are 1.434, $ND_9$, is 1.613, $\nu_1$ is 51.1, $\nu_2$ is 40.8, $\nu_3$ is 47.4, $\nu_4$ and $\nu_6$ and $\nu_8$ are 26.1, $\nu_5$ and $\nu_7$ are 95.6, and $\nu_9$ is 44.3.

* * * * *